(12) United States Patent
De Pais Melo et al.

(10) Patent No.: US 10,473,545 B2
(45) Date of Patent: Nov. 12, 2019

(54) EQUIPMENT FOR CONTROLLING, MEASURING AND COMMUNICATING A PHYSICAL QUANTITY OF A CONTAINER CONTAINING A FLUID UNDER PRESSURE

(71) Applicant: Acail Gás, S.A, Santa Maria da Feira (PT)

(72) Inventors: Marco Alexandre De Pais Melo, Ovar (PT); Nuno Vasco Pinho Andrade, Souto Vfr (PT)

(73) Assignee: ACAIL GÁS S.A., Santa Maria de Feira (PT)

( * ) Notice: Subject to any disclaimer, the term of this patent is extended or adjusted under 35 U.S.C. 154(b) by 211 days.

(21) Appl. No.: 14/994,302

(22) Filed: Jan. 13, 2016

(65) Prior Publication Data

US 2016/0313204 A1   Oct. 27, 2016

(30) Foreign Application Priority Data

Apr. 22, 2015 (PT) .......................... 108396

(51) Int. Cl.
 *G01L 19/08*   (2006.01)
(52) U.S. Cl.
 CPC .................. *G01L 19/086* (2013.01)
(58) Field of Classification Search
 CPC ........ G01L 19/086; G01L 19/16; F17C 13/00; F17C 13/025; F17C 13/028;
 (Continued)

(56) References Cited

U.S. PATENT DOCUMENTS 4,319,188 A  3/1982 Ito et al.
4,420,811 A  12/1983 Tarnay et al.
(Continued)

FOREIGN PATENT DOCUMENTS

EP  0540079 A1  5/1993
EP  2792919 A1  10/2014
(Continued)

OTHER PUBLICATIONS

European Search Report, dated Jun. 20, 2016, corresponding to EP Application No. 15 19 8611.
(Continued)

*Primary Examiner* — Eric Keasel
(74) *Attorney, Agent, or Firm* — Ladas & Parry LLP; Malcolm J. MacDonald (57) ABSTRACT

The present invention relates to an apparatus for controlling, measuring and reporting a physical quantity, more specifically to an apparatus that can be adapted to any valve of a container containing a fluid under pressure, more particularly a device that can be adapted to any valve of a container containing a gas or liquid under pressure. It has a particularly advantageous application in the general field of measuring the pressure of the output flow of fluid, in particular industrial or medicinal fluids contained in bottles. The machine comprises the support, electromechanical switch constituted by the dosing knob and the support for the dosing knob which incorporates the electronic circuitry for controlling the rate of fluid flow by pressure sensor for reading the output pressure of the fluid from the container and by the data processing system for processing the data obtained by the electromechanical switch and by the pressure sensor. This information can be viewed on the display or remotely transmitted.

12 Claims, 7 Drawing Sheets

(58) Field of Classification Search
CPC ........ F17C 2250/043; F17C 2250/0443; F17C 2250/0426; F17C 2250/0626; F17C 2250/0636
See application file for complete search history.

(56) References Cited

U.S. PATENT DOCUMENTS

| | | | |
|---|---|---|---|
| 4,738,541 A | 4/1988 | Weber | |
| 8,550,114 B2* | 10/2013 | Levine | G01F 22/02 137/552 |
| 9,273,799 B2* | 3/2016 | Fowler | F16K 37/005 |
| 9,435,675 B2* | 9/2016 | Wise | G01F 15/0755 |
| 2005/0199842 A1 | 9/2005 | Parsons et al. | |
| 2010/0156402 A1 | 6/2010 | Straubinger et al. | |
| 2013/0240045 A1 | 9/2013 | Feng | |
| 2014/0130875 A1* | 5/2014 | Fowler | F16K 37/005 137/1 |
| 2015/0057816 A1 | 2/2015 | Schick et al. | |

FOREIGN PATENT DOCUMENTS

| | | | |
|---|---|---|---|
| FR | 2901873 A1 | 12/2007 | |
| FR | 2919376 A1 | 1/2009 | |
| GB | 2225453 A | 5/1990 | |

OTHER PUBLICATIONS

European Search Opinion, dated Jun. 20, 2016, corresponding to EP Application No. 15 19 8611.

* cited by examiner

EQUIPMENT FOR CONTROLLING, MEASURING AND COMMUNICATING A PHYSICAL QUANTITY OF A CONTAINER CONTAINING A FLUID UNDER PRESSURE

SCOPE OF THE INVENTION

The present invention relates to an apparatus for the control, measuring and communicating a physical quantity, more specifically to a device that can be adapted to any valve of a container containing a fluid under pressure, more particularly a device that can be adapted to any valve of a container containing a gas or a liquid under pressure.

The invention has a particularly advantageous application in the general field of measuring the pressure of the fluid output flow, in particular industrial or medicinal fluids contained in bottles.

This invention has as its object a device whose technical problem is an electromechanical system that allows the selection of pre-set flow quantities, to be used in valves of containers containing fluids under pressure.

BACKGROUND OF THE INVENTION

There are known in the art several ways to control and measure the output pressure of a fluid contained in a container, in particular by connecting the container to external devices, which can be either acquisition means of fluid pressure, such as pressure sensors located within or downstream the container, or flow control means such as pressure regulators or flow regulators.

However, these systems have the great disadvantage of not being possible to use in order to measure the consumptions and its communication for subsequent reading, thus not guaranteeing the traceability of the consumption.

As a matter of fact, in many applications, the same fluid container can be successively moved to different places where limited amounts of fluid are consumed. This is the case, for example, of the so called "nomadic gas" bottles installed in ambulances or used in specific situations.

In many of these situations it is necessary to know the precise amount of consumed fluid, not only required for administrative procedures, either billing or consumption tracking, but even to control the amount of fluid still available in the container. However, this information is not guaranteed with the current systems.

Within the scope of the equipment that offer solutions to the above mentioned problems, we can mention the patent FR 2919376 referring to a "Valve system to a bottle of fluid under pressure". As a complement to this document we refer to the patents FR 2901873 and FR 2901874 that mention "Device to indicate a physical quantity."

ADVANTAGES OF THE INVENTION

As differentiating elements of the existing devices, the equipment has the great advantage of being a device that can be attached to any valve available on the market, without the need to change the same, thus maintaining unchanged the technical and security features of the manufacturer of the valve.

It also has the advantage of providing a technical effect of increased strength of the equipment when compared to the electronic selection systems belonging to the prior art.

BRIEF DESCRIPTION OF DRAWINGS

These and other features can be readily understood by the accompanying drawings, which should be considered as examples and not as restrictive in any way of the scope of the invention. In the drawings, for illustrative purposes, the measurements of some of the elements may be exaggerated and not drawn to scale. The absolute dimensions and the relative dimensions do not correspond to the real relationships for carrying out the invention.

In the figures are visible their various components and accessories:
- container (1) support (2), display (3), remote transmission system (4), manual safety valve (5), a mechanical interlock valve (6), adjustable mechanical valve (7);
- electromechanical switch (S1), dosing knob (S1.1), sensitive elements (S1.1.1), slots (S1.1.2), support for the dosing knob (S1.2), electronic circuit (S1.3), circuits (S1.3.1), contact points (S1.3.1.1);
- pressure sensor (S2);
- data processing system (S3).

DETAILED DESCRIPTION OF THE INVENTION

The following description, with reference to the accompanying drawings, is given as a non-limiting example, in which the invention is explained and how the same may be carried out.

The present invention relates to an apparatus for the control, measuring and reporting a physical quantity, more specifically to a device that can be adapted to any valve of a container containing a fluid under pressure, more particularly a device that can be adapted to any valve of a container containing a gas or a liquid under pressure.

The terms "substantially horizontal", "substantially vertical", shall be construed as preferred positions for the embodiment of the invention, being the same operable in other positions, and are the positions perceived by an observer who observes the container placed in a vertical position. It is noted that the terms are used interchangeably in appropriate circumstances and that the embodiments of the invention described herein are capable of functioning in other orientations in addition to those described or illustrated herein.

The expression "sensitive element" must be understood as any element capable of detecting a physical or chemical change, namely but not limited to: magnets, piezoelectric materials, optical sensors, infrared sensors, pressure sensors.

Figure 1:
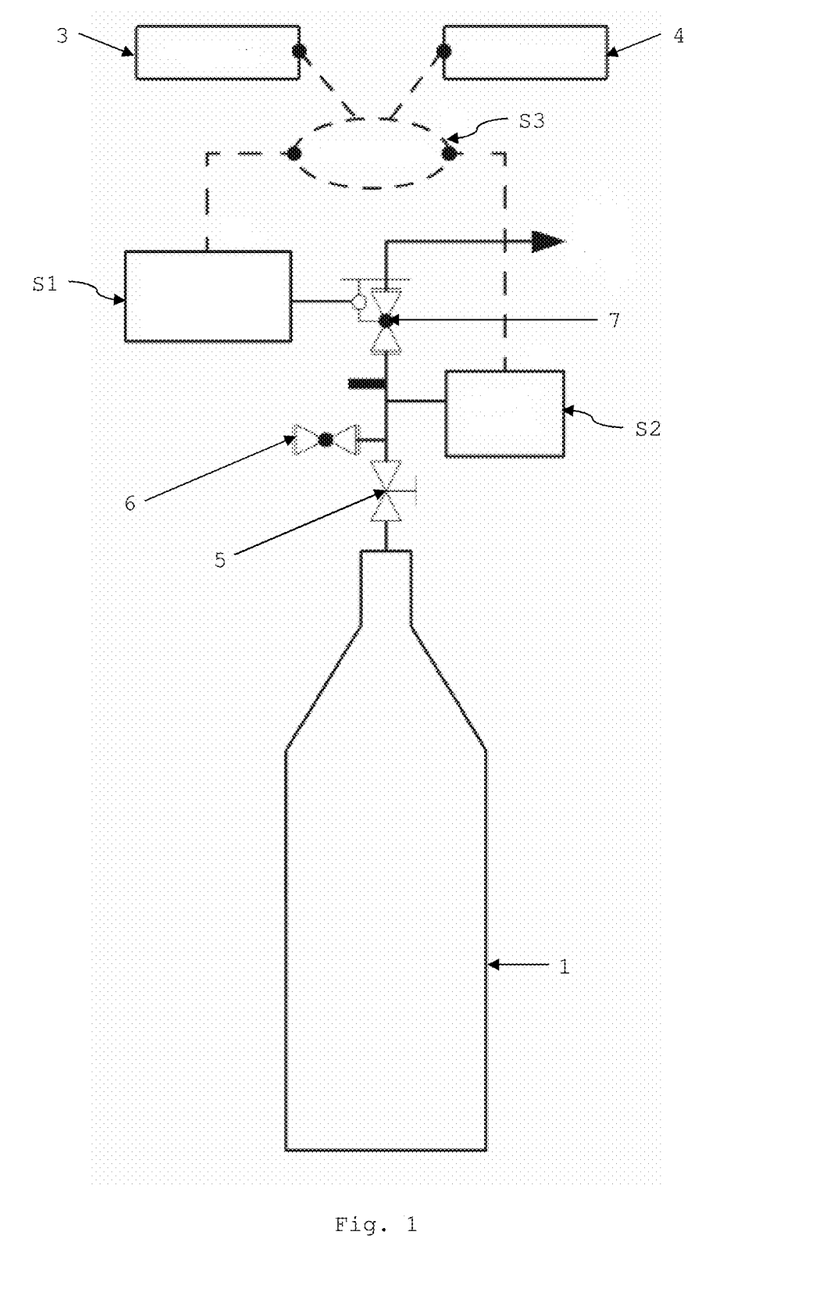
FIG. 1 shows a diagram of a first embodiment of the various constituent parts of the apparatus according to the invention.

In a first embodiment according to FIG. 1, starting from the container (1), there are, in succession, the following devices:
- a manual safety valve (5) for opening and closing the container (1);
- a mechanical interlocking valve (6) with fixed rate, namely, but not limited to, 4 bar, for connecting to devices present in structures, such as an ambulance or an hospital bed;
- a pressure sensor (S2) for reading the outlet pressure of the fluid of the container (1);
- an adjustable mechanical valve (7) for the fluid outlet, connected to the dosing knob (S1.1);
- electromechanical switch (S1) for controlling and identifying the positions of the dosing knob (S1.1) of the container (1);
- data processing system (S3) for processing the data obtained from the electromechanical switch (S1) and from the pressure sensor (S2);
- display (3) for the local display of the data processed by the data processing system (S3);
- remote transmission system (4) for the remote transmission of the data processed by the data processing system (S3).

Figure 2:
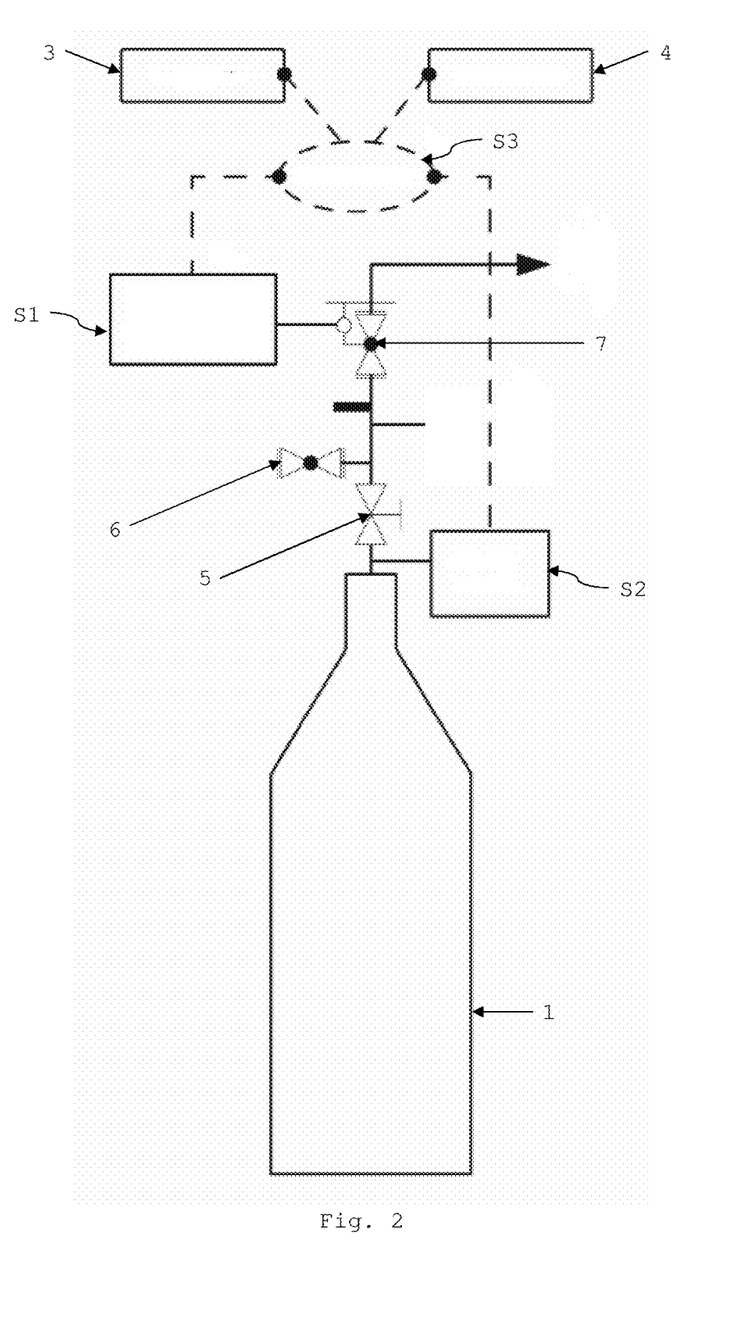
FIG. 2 shows a diagram of a second embodiment of the various constituent parts of the apparatus of the invention.

In a second embodiment, according to FIG. 2, from the container (1) there are in succession the following devices:
- a pressure sensor (S2) for reading the outlet pressure of the fluid in the container (1);
- a manual safety valve (5) for opening and closing the container (1);
- a mechanical interlocking valve (6) with fixed rate, including, but not limited to, 4 bar, for connecting to devices existing in structures, such as an ambulance or an hospital bed;
- an adjustable mechanical valve (7) for the fluid outlet connected to the dosing knob (S1.1);
- electromechanical switch (S1) for controlling and identifying the dosing knob (S1.1) position the container (1);
- data processing system (S3) for processing the data obtained from the electromechanical switch (S1) and from the pressure sensor (S2);
- display (3) for local display of the data processed by the data processing system (S3);
- remote transmission system (4) for the remote transmission of data processed by the data processing system (S3).

Figure 3:
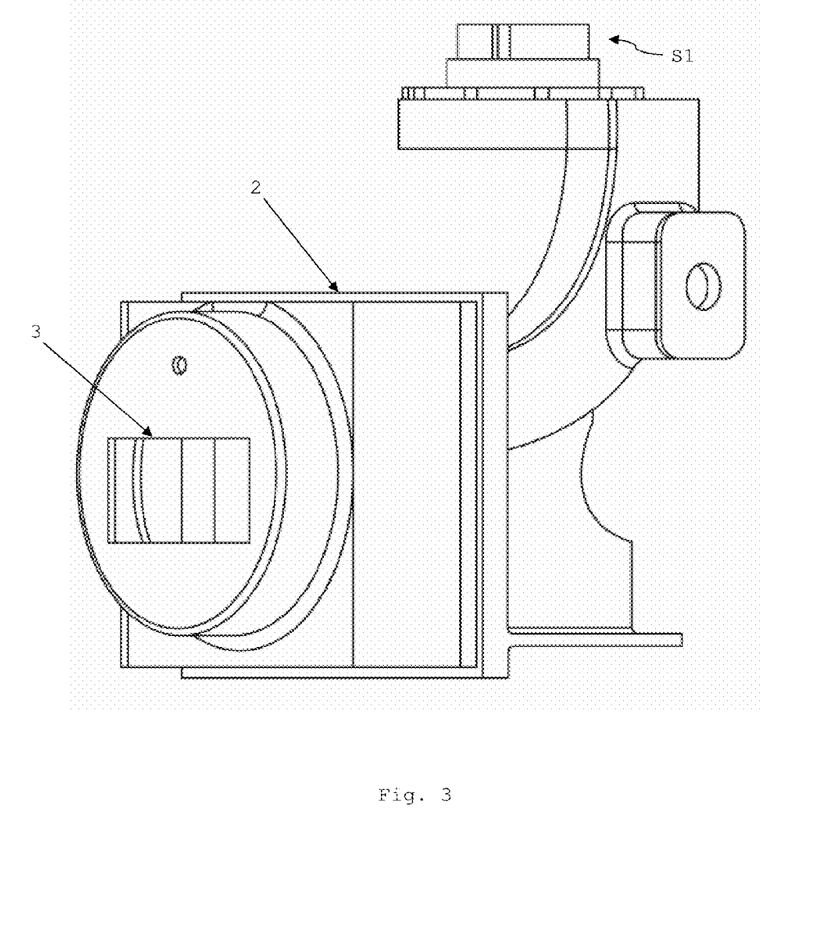
FIG. 3 shows a perspective view of the support (2) and the electromechanical switch (S1) of the equipment of the invention, ready to be mounted on a valve.

According to FIG. 3 are part of the apparatus of the invention the display (3), the support (2) and the dosing knob (S1.1). The display (3) is in a substantially vertical position mounted on one of the surfaces of the support (2).The dosing knob (S1.1) is in a substantially horizontal position mounted on one of the surfaces of the support (2).

Figure 4:
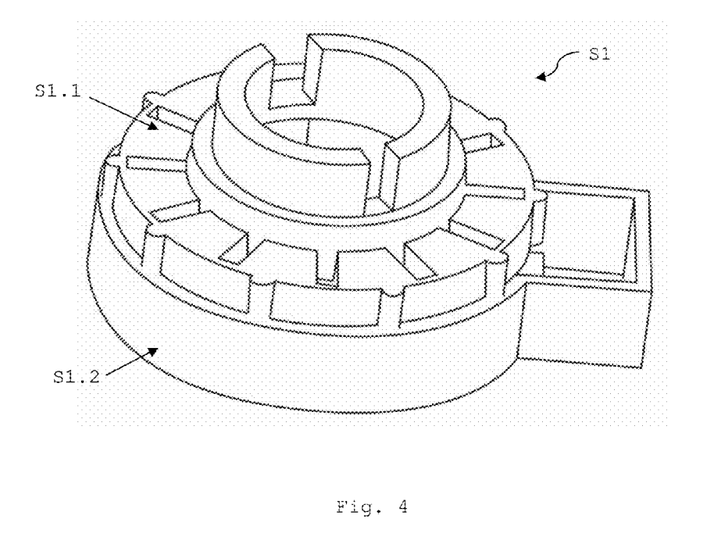
FIG. 4 shows a perspective view of the electromechanical switch (S1), constituted by the dosing knob (S1.1) and the support for the dosing knob (S1.2).
Figure 5:
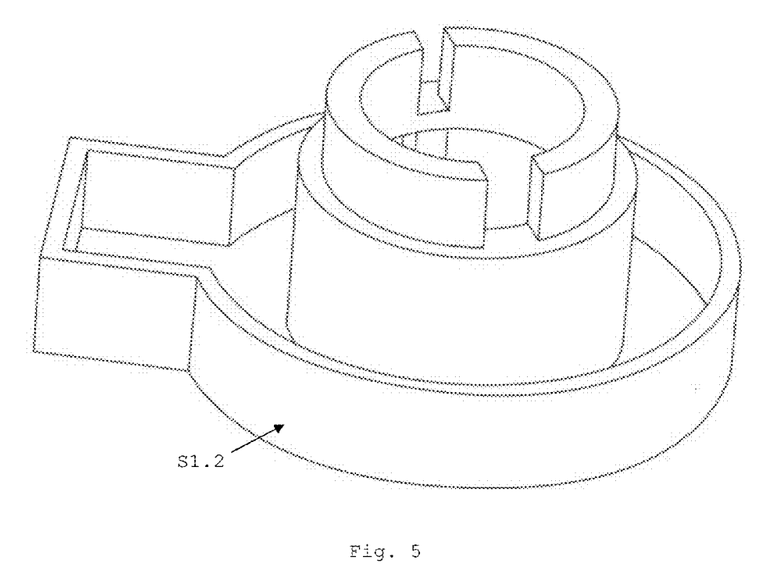
FIG. 5 shows a perspective view of the stationary part of the electromechanical switch (S1) constituted by the support for the dosing knob (S1.2) which incorporates the electronic circuit.

According to FIG. 4 the electromechanical switch (S1) is constituted by the dosing knob (S1.1) and by the support for the dosing knob (S1.2) which integrates the electronic circuit (S1.3).

Figure 6:
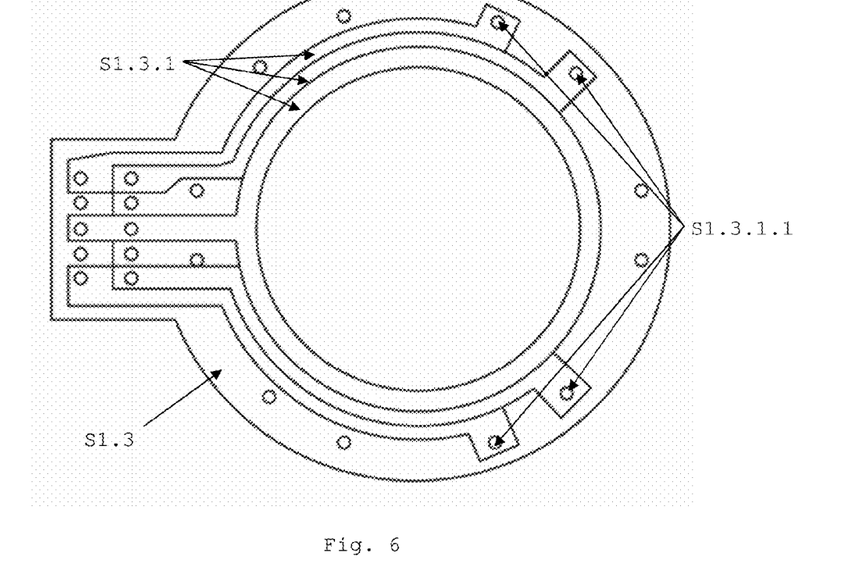
FIG. 6 shows a top view of the electronic circuit (S1.3) constituted by circuits (S1.3.1) comprising the contact points (S1.3.1.1).
Figure 7:
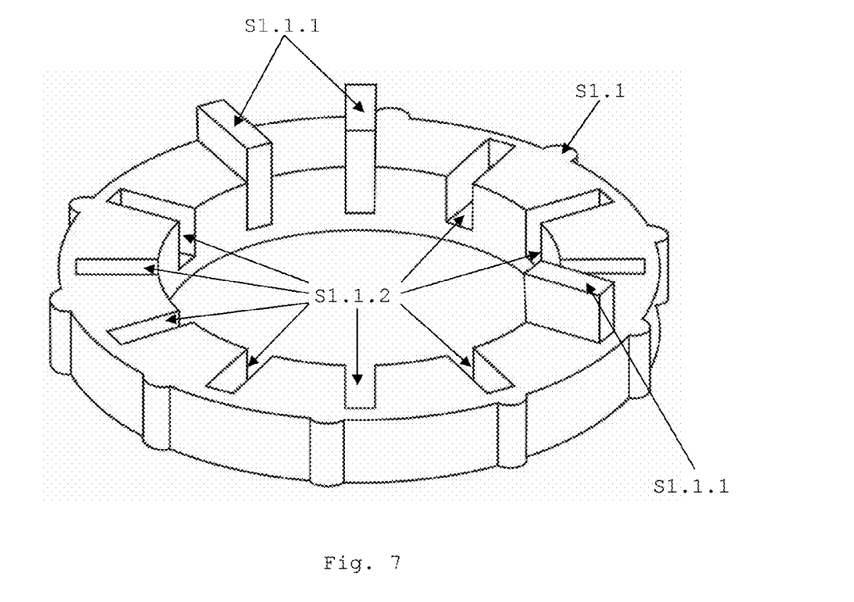
FIG. 7 shows a perspective view of the movable part of the electromechanical switch (S1), formed by the dosing knob, being possible to see the sensitive elements (S1.1.1) and the slots (S1.1.2).

The electronic circuit (S1.3) visible in FIG. 6 fits into the support for the dosing knob (S1.2).The dosing knob (S1.1) visible in FIG. 7 will also be inserted into the support for the dosing knob (S1.2) being placed immediately above the electronic circuit (S1.3).

Figure 8:
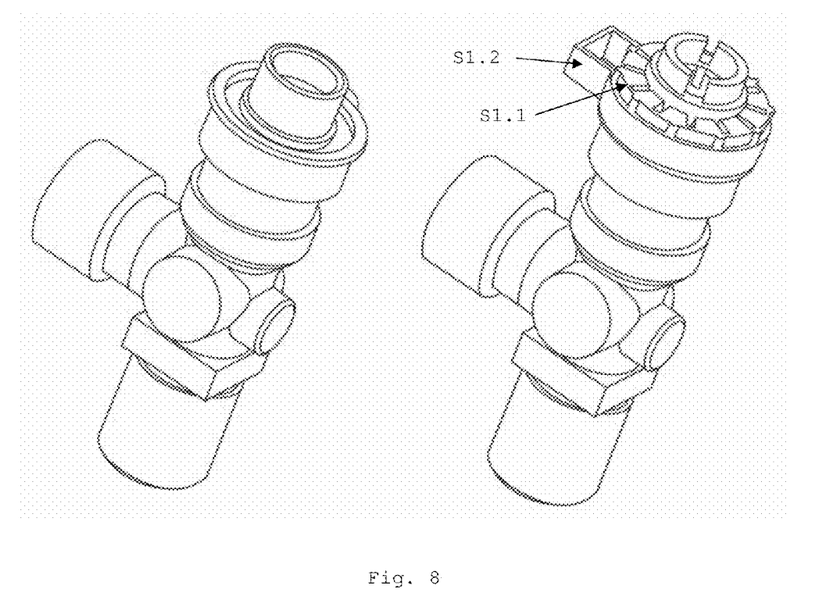
FIG. 8 shows a perspective view of the apparatus of the invention mounted without the support on a valve.
Figure 9:
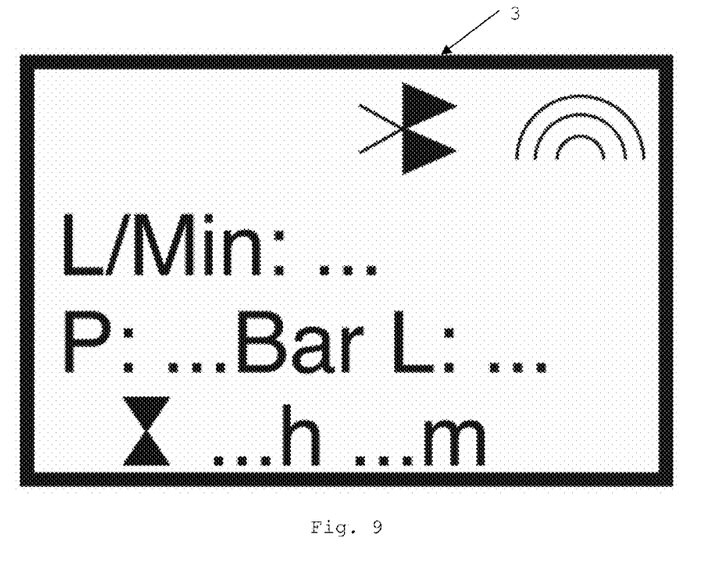
FIG. 9 shows a view of the display (3).
Figure 10:
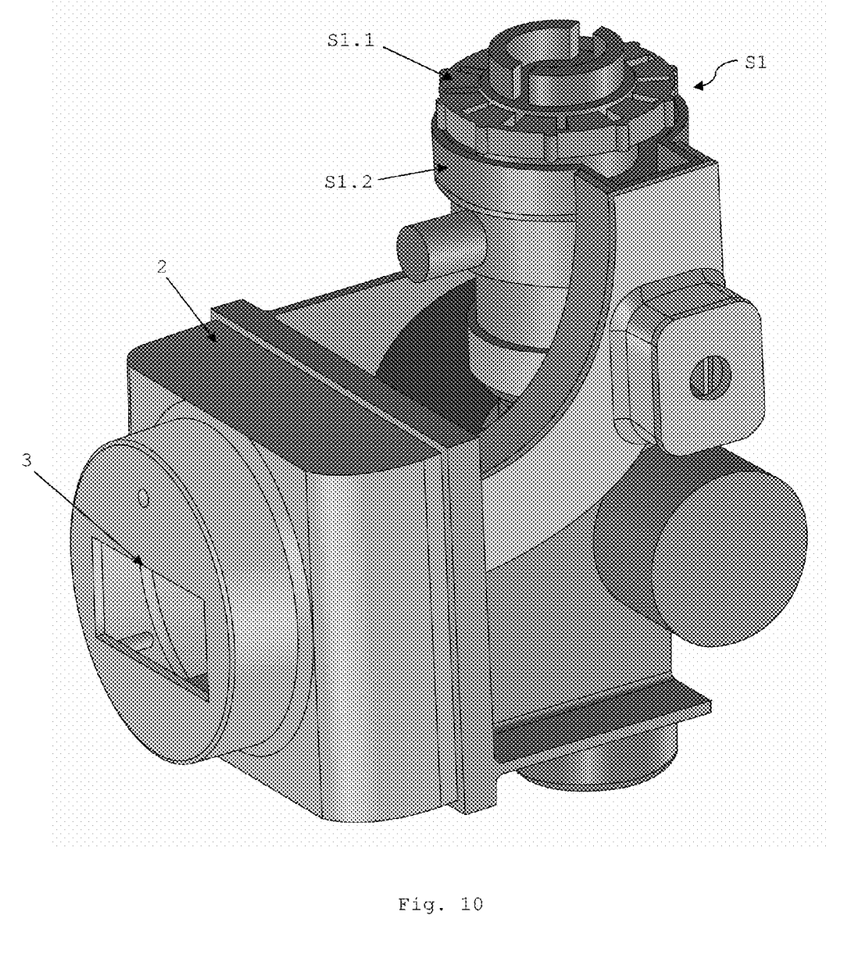
FIG. 10 shows a perspective view of the device of the invention mounted on a valve.

According to FIG. 8, the dosing knob (S1.1) is coupled through slots (S1.1.2) to the adjustable mechanical valve (7), allowing the fluid flow to be controlled by this dosing knob (S1.1). Since each of the various slots present in the dosing knob (S1.1) corresponds to a previously programmed precise flow rate, by simply turning the dosing knob (S1.1) and the number of slots it is possible to know the flow rate to be debited.

As seen in FIG. 7, taking into account that both the sensitive elements (S1.1.1) and the slots (S1.1.2) are part of the dosing knob (S1.1), to each position of the dosing knob (S1.1) corresponds the selection of a slot (S1.1.2) and one position of the sensitive elements. (S1.1.1).

Being the dosing knob (S1.1) positioned adjacent to the electronic circuit (S1.3), the sensitive elements (S1.1.1) when coming into contact with the contact points (S1.3.1.1) of the circuits (S1.3.1) of the electronic circuit (S1.3) activate at least one of the circuits (S1.3.1) of the electronic circuit (S1.3).

In an embodiment of the present invention in which the sensitive elements are magnets, through an electromagnetic effect, this activation is transmitted to the electronic circuit (S1.3), which in turn transmits it to the electronic board that includes the data processing system (S3).

Since each position of the dosing knob (S1.1) corresponds to a position of the sensitive elements (S1.1.1), which corresponds to the activation of a specific combination of circuits (S.1.3.1) that make up the electronic circuit (S1.3), it is possible for the data processing system (S3) to determine the value of the flow rate.

This information will then be available to be displayed on the display (3) as shown in FIG. 8, or transmitted remotely by any communication system, namely, but not limited to: Bluetooth, Wi-Fi, GSM or LTE.

A pressure sensor (S2) reads the outlet pressure of the fluid of the container (1). This information is transmitted to the electronic circuit (S1.3), which in turn transmits it to the electronic board which integrates the data processing system (S3).This information will then be available to be displayed on the display (3) as shown in FIG. 8, or transmitted remotely by any communication system, namely, but not limited to: Bluetooth, Wi-Fi, GSM or LTE.

It is thus possible at any time, either through a local reading or through a remote reading, to know the rate of flow of the fluid, the outlet pressure of the fluid, as well as amount of fluid still remaining within the container (1).

Based on the collected and aforementioned information, it is possible through calculations made on the data processing system (S3) or their export to an external data system, to know the runtime of the container (1), to trace the many consumptions.

The invention claimed is:

1. A device for controlling, measuring, and reporting a physical quantity of a container containing a fluid under pressure, the device comprising:
   a pressure sensor in fluid communication with the container;
   an electromechanical switch; and
   a processor arranged for processing data obtained by the pressure sensor and by the electromechanical switch;
   wherein the electromechanical switch comprises:
   a housing comprising a cavity defined by walls of the housing;

an electronic circuit disposed in the cavity, the electronic circuit having an upper surface comprising a circuitry having points of contact;

a dosing knob having a lower surface comprising a plurality of slots and a plurality of sensitive elements;

wherein the dosing knob is positioned in the housing such that the lower surface of the dosing knob is adjacent to the upper surface of the electronic circuit;

wherein the processor determines the value of the flow rate referent to the active combination of circuits that make up the electronic circuit.

2. The device according to claim 1, wherein the processor comprises a display.

3. The device according to claim 1, wherein the processor comprises a remote transmission system.

4. The device according to claim 1, wherein the dosing knob is connected via the plurality of slots to an adjustable mechanical valve.

5. The device according to claim 1, wherein a position of the dosing knob in the electromechanical switch corresponds to a selection of one of the plurality of slots and a selection of one of the plurality of sensitive elements.

6. The device according to claim 1, wherein a central portion extends from a portion of the housing.

7. The device according to claim 6, wherein a central opening is defined in the electronic circuit, and wherein the central portion extends through the central opening of the electronic circuit when the electronic circuit is disposed in the cavity.

8. The device according to claim 6, wherein a central opening is defined in the dosing knob, and wherein the central portion extends through the central opening of the dosing knob when the dosing knob is disposed in the cavity.

9. The device according to claim 6, wherein the sensitive elements are magnets.

10. The device according to claim 1, wherein the cavity of the housing comprises a truncated circular cavity and a central portion extending from a central area of the truncated circular cavity.

11. A method of calculating a flow rate value of an output flow of fluid from a container under pressure, the method comprising:

providing the device according to claim 1;

manually selecting a position of the dosing knob, to allow the sensitive elements contacting the contact points on the electronic circuit to activate a circuit in the electronic circuit, a signal from the activated circuit being transmitted to the processor;

calculating, using the processor, a value of the flow rate from a combination of circuits that are activated.

12. The method according to claim 11, wherein the flow rate value is displayed on a display, or transmitted by wireless communication to a remote source.

* * * * *